(12) United States Patent
Li et al.

(10) Patent No.: US 11,967,151 B2
(45) Date of Patent: Apr. 23, 2024

(54) VIDEO CLASSIFICATION METHOD AND APPARATUS, MODEL TRAINING METHOD AND APPARATUS, DEVICE, AND STORAGE MEDIUM

(71) Applicant: Tencent Technology (Shenzhen) Company Limited, Shenzhen (CN)

(72) Inventors: Yan Li, Shenzhen (CN); Xintian Shi, Shenzhen (CN); Bin Ji, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 319 days.

(21) Appl. No.: 17/515,164

(22) Filed: Oct. 29, 2021

(65) Prior Publication Data
US 2022/0051025 A1    Feb. 17, 2022

Related U.S. Application Data

(63) Continuation of application No. PCT/CN2020/117358, filed on Sep. 24, 2020.

(30) Foreign Application Priority Data

Nov. 15, 2019    (CN) .......................... 201911121362.5

(51) Int. Cl.
*G06K 9/00*    (2022.01)
*G06F 18/214*    (2023.01)
(Continued)

(52) U.S. Cl.
CPC ............ *G06V 20/41* (2022.01); *G06F 18/214* (2023.01); *G06F 18/253* (2023.01); *G06V 20/46* (2022.01); *G06V 20/49* (2022.01)

(58) Field of Classification Search
CPC ........ G06V 20/41; G06V 20/46; G06V 20/49; G06V 10/454; G06V 10/62; G06V 10/82;
(Continued)

(56) References Cited

U.S. PATENT DOCUMENTS

2014/0328537 A1    11/2014    Schertler et al.
2015/0205997 A1*    7/2015    Ma ....................... G06V 40/171
382/118

(Continued)

FOREIGN PATENT DOCUMENTS

CN    103390154 A    11/2013
CN    106599907 A    4/2017
(Continued)

OTHER PUBLICATIONS

Tencent Technology, WO, PCT/CN2020/117358, Dec. 21, 2020, 5 pgs.
Tencent Technology, IPRP, PCT/CN2020/117358, May 17, 2022, 6 pgs.
Tencent Technology, ISR, PCT/CN2020/117358, Dec. 21, 2020, 3 pgs.
(Continued)

*Primary Examiner* — Dhaval V Patel
(74) *Attorney, Agent, or Firm* — Morgan, Lewis & Bockius LLP

(57) ABSTRACT

Embodiments of this application disclose a video classification method performed by a computer device and belong to the field of computer vision (CV) technologies. The method includes: obtaining a video; selecting n image frames from the video; extracting respective feature information of the n image frames according to a learned feature fusion policy by using a feature extraction network, the learned feature fusion policy being used for indicating proportions of the feature information of the other image frames that have been fused with feature information of a first image frame in the n image frames; and determining a classification result of the video according to the respective feature information of the n image frames. By replacing
(Continued)

complex and repeated 3D convolution operations with simple feature information fusion between adjacent image frames, time for finally obtaining a classification result of the video is therefore reduced, thereby having high efficiency.

20 Claims, 11 Drawing Sheets

(51) Int. Cl.
  *G06F 18/25* (2023.01)
  *G06V 20/40* (2022.01)
(58) Field of Classification Search
  CPC ... G06V 10/806; G06F 18/214; G06F 18/253; G06N 3/045; G06N 3/08
  See application file for complete search history.

(56) References Cited

U.S. PATENT DOCUMENTS

| | | | | |
|---|---|---|---|---|
| 2017/0140253 | A1* | 5/2017 | Wshah | G06V 20/54 |
| 2019/0354797 | A1* | 11/2019 | Nesta | G06F 18/256 |
| 2020/0380294 | A1* | 12/2020 | Zhai | G06T 3/60 |
| 2021/0174149 | A1* | 6/2021 | Zhou | G06V 10/82 |
| 2021/0303911 | A1* | 9/2021 | Li | G06V 10/82 |

FOREIGN PATENT DOCUMENTS

| | | |
|---|---|---|
| CN | 108898067 A | 11/2018 |
| CN | 109886951 A | 6/2019 |
| CN | 109919166 A | 6/2019 |
| CN | 110070511 A | 7/2019 |
| CN | 110929622 A | 3/2020 |

OTHER PUBLICATIONS

Ya-Liang Chang et al., "Learnable Gated Temporal Shift Module for Deep Video Inpainting", National Taiwan University, 12 pgs.
Tencent Technology, European Office Action, EP Patent Application No. 20886816.6, Jun. 12, 2023, 16 pgs.
Ali Diba et al., "Temporal 3D ConvNets: New Architecture and Transfer Learning for Video Classification", arxiv.org, Nov. 22, 2017, XP081301293, 9 pgs.
Dongliang He et al., "StNet: Local and Global Spatial-Temporal Modeling for Action Recognition", arxiv.org, Nov. 5, 2018, XP081433734, 8 pgs.
Du Tran et al., "A Closer Look at Spatiotemporal Convolutions for Action Recognition", arxiv.org, Nov. 30, 2017, XP081313964, 10 pgs.
Extended European Search Report, EP20886816.6, Aug. 1, 2022, 10 pgs.
Ji Lin et al., "TSM: Temporal Shift Module for Efficient Video Understanding", arxiv.org, Nov. 20, 2018, XP081467138, 13 pgs.
Lin Sun et al., "Human Action Recognition Using Factorized Spatio-Temporal Convolutional Networks", Oct. 2, 2015, XP055945218, 9 pgs., Retrieved from the Internet: https://arxiv.org/pdf/1510.00562.pdf.
Saining Xie et al., "Rethinking Spatiotemporal Feature Learning for Video Understanding", arxiv.org, Dec. 13, 2017, XP080843447, 10 pgs.
Yan Li et al., "TEA: Temporal Excitation and Aggregation for Action Recognition", arxiv.org, Apr. 3, 2020, XP081635821, 15 pgs.
Zhaofan Qiu et al., "Learning Spatio-Temporal Representation with Pseudo-3D Residual Networks", arxiv.org, Nov. 28, 2017, XP081297703, 9 pgs.

\* cited by examiner

VIDEO CLASSIFICATION METHOD AND APPARATUS, MODEL TRAINING METHOD AND APPARATUS, DEVICE, AND STORAGE MEDIUM

CROSS-REFERENCE TO RELATED APPLICATIONS

This application is a continuation application of PCT Patent Application No. PCT/CN2020/117358, entitled "VIDEO CLASSIFICATION METHOD AND APPARATUS, MODEL TRAINING METHOD AND APPARATUS, DEVICE AND STORAGE MEDIUM" filed on Sep. 24, 2020, which claims priority to Chinese Patent Application No. 201911121362.5, filed with the State Intellectual Property Office of the People's Republic of China on Nov. 15, 2019, and entitled "VIDEO CLASSIFICATION METHOD AND APPARATUS, MODEL TRAINING METHOD AND APPARATUS, DEVICE, AND STORAGE MEDIUM", all of which are incorporated herein by reference in their entirety.

FIELD OF THE TECHNOLOGY

Embodiments of this application relate to the field of computer vision (CV) technologies, and in particular, to a video classification method and apparatus, a model training method and apparatus, a device, and a storage medium.

BACKGROUND OF THE DISCLOSURE

To enable a user to learn about video content more quickly, a corresponding video classification label is usually set for each video.

In the related art, a video classification label is set in the following manner: equally dividing a video into a plurality of sub-videos; extracting one image frame from each of the plurality of sub-videos, to obtain a plurality of image frames; performing a three-dimensional (3D) convolution operation on the plurality of image frames in a spatial dimension and a time dimension separately, to obtain feature information of each image frame fused with feature information of other image frames; and determining a video classification label of the video according to the feature information of each image frame.

However, due to a large amount of calculation in the 3D convolution operation in the related art, it takes a relatively long time to finally obtain the video classification label.

SUMMARY

Embodiments of this application provide a video classification method and apparatus, a model training method and apparatus, a device, and a storage medium, which shortens a time for finally obtaining a classification result of a video. The technical solutions are as follows:

According to an aspect, an embodiment of this application provides a video classification method performed by a computer device, the method including:
  obtaining a video;
  selecting n image frames from the video, n being a positive integer;
  extracting respective feature information of the n image frames according to a learned feature fusion policy by using a feature extraction network, the learned feature fusion policy being used for indicating, when a first image frame in the n image frames is fused with feature information of other image frames in the n image frames, proportions of the feature information of the other image frames; and
  determining a classification result of the video according to the respective feature information of the n image frames, wherein feature information of an edge image frame in the n image frames is weighted differently from feature information of a non-edge image frame in the n image frames.

According to another aspect, an embodiment of this application provides a computer device, including a processor and a memory, the memory storing at least one program, the at least one program being loaded and executed by the processor to implement the foregoing video classification method.

According to still another aspect, an embodiment of this application provides a non-transitory computer-readable storage medium, storing at least one program, the at least one program being loaded and executed by a processor to implement the foregoing video classification method.

The technical solutions provided in the embodiments of this application may bring the following beneficial effects:

Feature information of image frames is extracted according to a learned feature fusion policy, the feature fusion policy indicating, when each image frame is fused with feature information of other image frames, proportions of the feature information of the image frames, and a classification result of a video is determined according to the feature information of the image frames. According to the feature fusion policy, only simple information fusion between adjacent image frames needs to be implemented, and it is unnecessary to perform convolution in both a spatial dimension and a time dimension as 3D convolution. In the feature fusion policy, by replacing complex and repeated 3D convolution operations with simple feature information fusion, a workload is small, and a time for finally obtaining a classification result of the video is relatively short, thereby having high efficiency.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
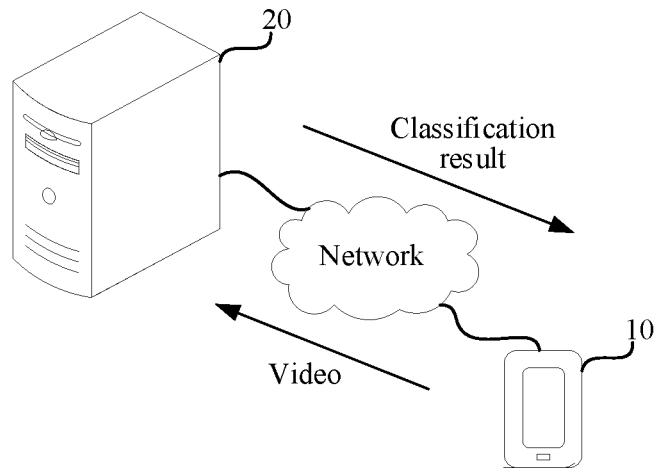
FIG. 1 is a schematic diagram of an implementation environment according to an embodiment of this application.

To make objectives, technical solutions, and advantages of this application clearer, the following further describes implementations of this application in detail with reference to the accompanying drawings.

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline and relates to a wide range of fields including both hardware-level technologies and software-level technologies. Basic AI technologies generally include technologies such as sensor, dedicated AI chip, cloud computing, distributed storage, a big data processing technology, operation/interaction system, and mechatronics. AI software technologies mainly include several major directions such as a CV technology, a speech processing technology, a natural language processing (NLP) technology, and machine learning (ML)/deep learning.

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

NLP is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

ML is a multi-field interdiscipline and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

The solutions provided in the embodiments of this application involve technologies such as CV, NLP, and ML of AI, and are specifically described by using the following embodiments.

To make the objectives, technical solutions, and advantages of this application clearer, the following further describes the implementations of this application in detail with reference to the accompanying drawings.

FIG. 1 is a schematic diagram of an implementation environment according to an embodiment of this application. The implementation environment may include a terminal 10 and a server 20.

A client is installed and run in the terminal 10. The client is a client configured to upload videos, for example, a video client. The terminal 10 may be an electronic device such as a mobile phone, a tablet computer, a wearable device, or a personal computer (PC).

The server 20 may be one server, a server cluster including a plurality of servers, or a cloud computing center. The server 20 may communicate with the terminal 10 through a wired or wireless network. The server 20 may obtain videos uploaded by the terminal 10, classifies the videos, and determines classification results of the videos, so as to transmit the determined classification results to the client in the terminal 10 for displaying, and performing video recommendation based on the classification results. The server 20 may further review and filter videos uploaded by the terminal 10, to determine whether the videos uploaded by the terminal 10 are objectionable videos. The objectionable videos may be, for example, violent videos and pornographic and vulgar videos. If the server 20 determines that a video uploaded by the terminal 10 is an objectionable video, the server confirms that the video fails to pass the review, filters the video, and feeds back a review failure message to the terminal 10.

Figure 2:
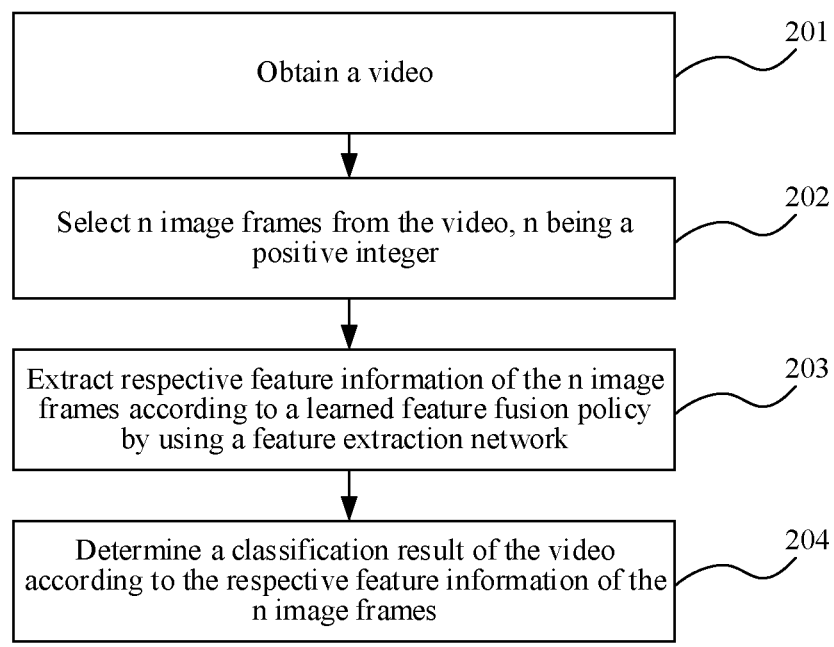
FIG. 2 is a flowchart of a video classification method according to an embodiment of this application.

FIG. 2 is a flowchart of a video classification method according to an embodiment of this application. An execution entity of the method may be a computer device. The computer device may be any electronic device with computing and processing capabilities, such as the terminal or server described in FIG. 1. The method may include the following steps:

Step 201: Obtain a video.

The video may be any video. The video may be a video uploaded by a terminal. For example, the video may be a video uploaded by a terminal on which a video client is installed.

Step 202: Select n image frames from the video, n being a positive integer.

The video is a collection of a plurality of sequentially arranged image frames. In some embodiments, the computer device selects n image frames from the video in a frame extraction manner, n being a total quantity of frames obtained after frame extraction of the video.

Step 203: Extract respective feature information of the n image frames according to a learned feature fusion policy by using a feature extraction network.

The feature extraction network is configured to extract feature information of the n image frames. For example, the feature extraction network is configured to fuse feature information of each image frame and other image frames according to the feature fusion policy, to obtain fused feature information of each image frame, and then the fused feature information is processed by using a network structure, to output final feature information of each image frame.

In this embodiment of this application, the feature fusion policy is used for indicating, when a first image frame in the n image frames is fused with feature information of other image frames in the n image frames, proportions of the feature information of the image frames.

The first image frame is any image frame in the n image frames, and the other image frames are all or some image frames in the n image frames other than the first image frame. In some embodiments, the other image frames are image frames adjacent to the first image frame. For example, there are five image frames: an image frame 1, an image frame 2, an image frame 3, an image frame 4, and an image frame 5. It is assumed that the first image frame is the image frame 2, then the other image frames may be the image frame 1 and the image frame 3. In this case, feature information of the image frame 2 that is extracted according to the feature fusion policy is fused with feature information of the image frame 1 and the image frame 3. The proportions of the feature information of the image frames indicated by the feature fusion policy when the first image frame is fused with the feature information of the other image frames in the n image frames are obtained through learning, and are not a fixed mode. In some embodiments, feature information of an image frame may be represented by using a grayscale value of a pixel in the image frame. The foregoing example is still used. It is assumed that a grayscale value of a pixel in the image frame 2 is 2, a grayscale value of a pixel in the image frame 1 is 3, a grayscale value of a pixel in the image frame 3 is 4, and a learned feature fusion policy is used for indicating, when the image frame 2 is fused with feature information of the image frame 1 and the image frame 3, that a proportion of the image frame 1 is 0.2, a proportion of the image frame 2 is 0.4, and a proportion of the image frame 3 is 0.4, then a grayscale value of a pixel in the image frame 2 that is extracted according to the feature fusion policy by using the feature extraction network is (0.2*3+0.4*2+0.4*4)=3.

The feature fusion policy has a simple design and is efficiently implemented, and can be embedded into the existing feature extraction network. By extracting feature information of image frames by using the feature fusion policy, information exchange and information fusion can be flexibly performed with other image frames. In the feature fusion policy, by replacing complex and repeated 3D convolution operations with simple feature information fusion, a workload is small. Feature information exchange between image frames is dynamic, and is not in a fixed mode. By using the feature fusion policy provided in this embodiment of this application, a suitable information exchange mode can be automatically learned more effectively.

Step 204: Determine a classification result of the video according to the respective feature information of the n image frames.

The feature information of the n image frames may represent feature information of the video, and a classification result of the video may be determined according to the respective feature information of the n image frames. The classification result of the video is used for representing a classification of the video. For example, the video is a violent video, a pornographic video, an animation video, or a science fiction video. In some embodiments, as described below, different images at different temporal positions of the video have different feature information and should not be treated equally by averaging them together. For example, the feature information of an edge image frame in the n image frames is weighted differently from the feature information of a non-edge image frame in the n image frames in order to enhance the expression capabilities of the local features in the image frames at the beginning or end of the video.

Based on the above, in the technical solution provided in this embodiment of this application, feature information of image frames is extracted according to a learned feature fusion policy, the feature fusion policy indicating, when each image frame is fused with feature information of other image frames, proportions of the feature information of the image frames, and a classification result of a video is determined according to the feature information of the image frames. According to the feature fusion policy, only simple information fusion between adjacent image frames needs to be implemented, and it is unnecessary to perform convolution in both a spatial dimension and a time dimension as 3D convolution. In the feature fusion policy, by replacing complex and repeated 3D convolution operations with simple feature information fusion, a workload is small, and a time for finally obtaining a classification result of the video is relatively short, thereby having high efficiency.

In addition, the feature fusion policy in this embodiment of this application is obtained based on learning, so that feature information fusion can be performed more efficiently and flexibly.

In an exemplary embodiment, the feature extraction network includes m cascaded network structures, m being a positive integer. The computer device may extract feature information of image frames in the following manner:

First: For the first image frame and before first feature information of the first image frame is inputted into a $k^{th}$ network structure of the feature extraction network, feature fusion is performed on the first feature information according to the feature fusion policy, to obtain processed first feature information, k being a positive integer less than or equal to m.

In this embodiment of this application, the processed first feature information is fused with feature information of the first image frame and the other image frames.

For example, the first feature information includes features of c channels, c being a positive integer.

For example, the computer device may obtain the processed first feature information through the following substeps:

1. Perform, for a feature of an $i^{th}$ channel in the first feature information, a convolution operation on a feature of the $i^{th}$ channel in the first image frame and features of the $i^{th}$ channel in the other image frames by using a learned convolution kernel, to obtain a processed feature of the $i^{th}$ channel in the first image frame, i being a positive integer less than or equal to c.

In this embodiment of this application, the convolution kernel is configured to define a feature fusion policy corresponding to the feature of the $i^{th}$ channel in the first image frame. Features of different channels in the first image frame may correspond to different feature fusion policies. That is, different channels in the first image frame correspond to different convolution kernels.

The feature of the $i^{th}$ channel in the first image frame may be represented by using a grayscale value of a pixel of the $i^{th}$ channel in the first image frame. It is assumed that there are 5 image frames: an image frame 1, an image frame 2, an image frame 3, an image frame 4, and an image frame 5, the first image frame is the image frame 2, the other image frames are the image frame 1 and the image frame 3, a size of a learned convolution kernel is 3, a parameter of the convolution kernel is [0.2, 0.4, 0.4], a grayscale value of a pixel of the $i^{th}$ channel in the image frame 1 is 3, a grayscale value of a pixel of the $i^{th}$ channel in the image frame 2 is 2, and a grayscale value of a pixel of the $i^{th}$ channel in the image frame 3 is 4, then a convolution operation is performed on the grayscale value of the pixel of the $i^{th}$ channel in the image frame 2 and the grayscale values of the pixels of the $i^{th}$ channel in the image frame 1 and the image frame 3 by using the convolution kernel, to obtain a processed grayscale value of the pixel of the $i^{th}$ channel in the image frame 2 is (0.2*3+0.4*2+0.4*4)=3.

2. Obtain the processed first feature information according to the processed features of the channels in the first image frame.

Assuming that the first feature information includes features of 256 channels, the processed first feature information is obtained according to the processed features of the 256 channels in the first image frame.

Figure 3:
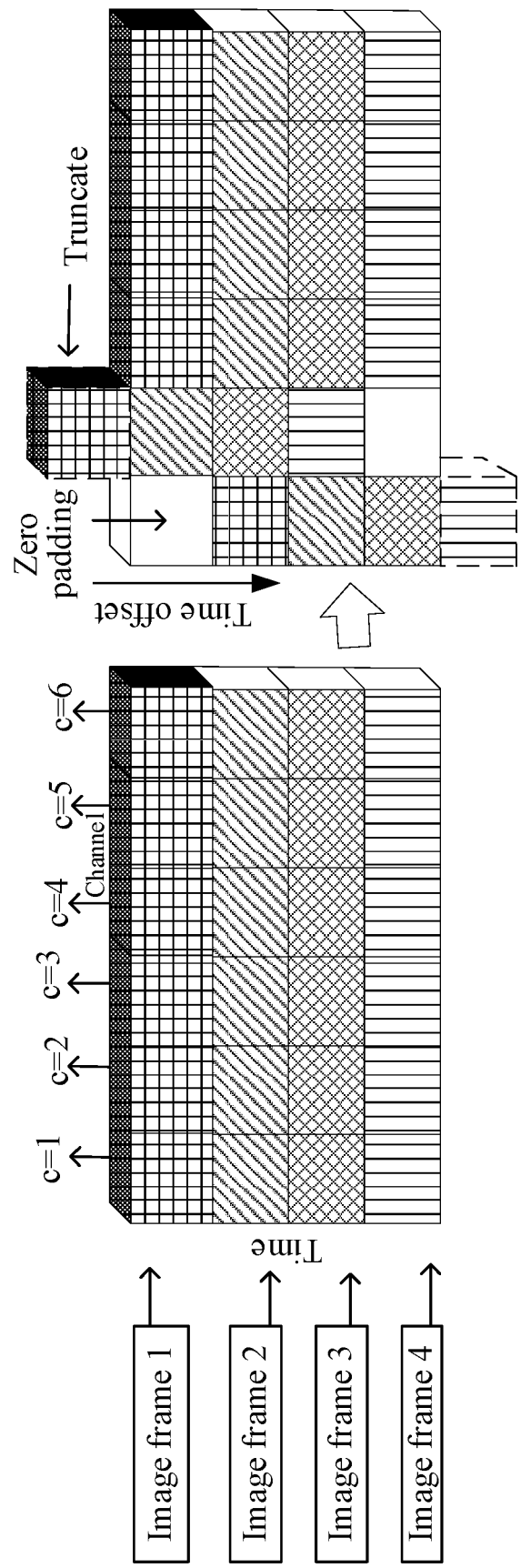
FIG. 3 is a schematic diagram of an offset policy in the related art.

FIG. 3 is a schematic diagram of an offset policy in the related art. It is assumed that respective feature information of four image frames (an image frame 1, an image frame 2, an image frame 3, an image frame 4) each includes features of six channels (represented by using c). In the related art, in a channel c=1, the computer device translates a feature of the image frame 1 into the image frame 2, translates a feature of the image frame 2 into the image frame 3, and translates a feature of the image frame 3 into the image frame 4; in a channel c=2, the computer device translates a feature of the image frame 2 into the image frame 1, translates a feature of the image frame 3 into the image frame 2, and translates a feature of the image frame 4 into the image frame 3; and in channels c=3 and c=4, features in the four image frames are kept unchanged. The offset policy in the related art may be regarded as using a convolution kernel with a convolution kernel size of 3 and a fixed convolution kernel parameter to perform a convolution operation on the feature of the $i^{th}$ channel in the first image frame and features of the $i^{th}$ channel in adjacent image frames. For example, a convolution kernel [001] is used to define that a feature of a channel in an image frame moves in an opposite direction in a time dimension, and a convolution kernel [100] is used to define that a feature of a channel in an image frame moves in a positive direction in a time dimension. For feature information of the image frame 2 and the image frame 3 after offset, the feature information of the image frame 2 is fused with feature information of the image frame 1 and the image frame 3, and the feature information of the image frame 3 is fused with feature information of the image frame 2 and the image frame 4. However, the offset policy in the related art is excessively rigid, and the mode of information exchange between image frames is fixed. For new feature information obtained after feature information of adjacent image frames are fused, a proportion of an original feature of each image frame in feature information after offset is also fixed. Apparently, the policy in the related art is not flexible enough. However, the convolution kernel parameter of the convolution kernel provided in this embodiment of this application is not fixed, and is obtained through learning, so that the feature fusion policy provided in this embodiment of this application is more flexible.

Second: The processed first feature information is processed by using the $k^{th}$ network structure, to generate second feature information of the first image frame.

Figure 4:
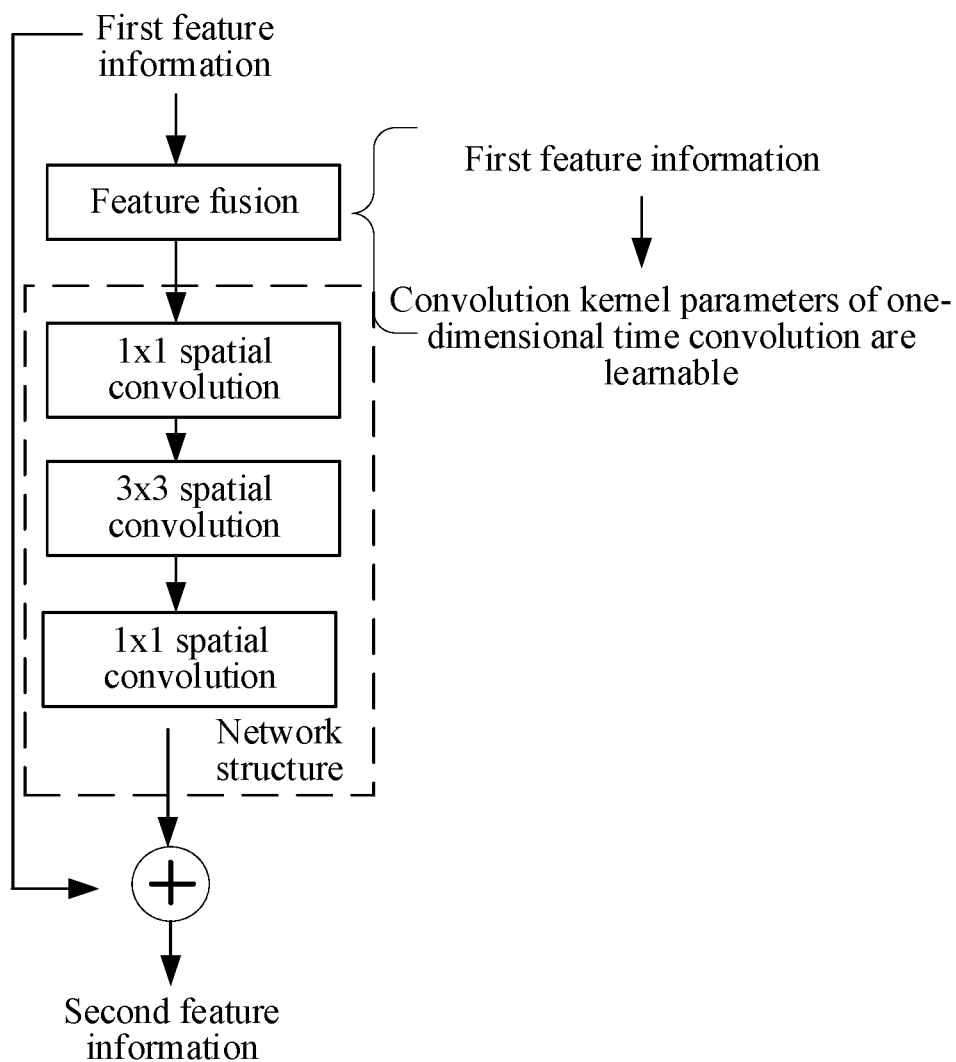
FIG. 4 is a schematic diagram of a residual structure according to an embodiment of this application.

The network structure is configured to perform spatial convolution on first feature information. For example, feature fusion and the network structure corresponding to the feature fusion policy form a residual structure. The $k^{th}$ network structure is any network structure in the m network structures. FIG. 4 is a schematic diagram of a residual structure according to an embodiment of this application. The residual structure includes feature fusion and a network structure. The network structure may include 1×1 spatial convolution, 3×3 spatial convolution, and 1×1 spatial convolution. An input of the residual structure is first feature information. Feature fusion is performed on the first feature information, to obtain processed first feature information. Subsequently, 1×1 spatial convolution, 3×3 spatial convolution, and 1×1 spatial convolution are separately performed on the processed first feature information, to obtain first feature information after convolution. The first feature information after convolution and the first feature information are added to obtain second feature information.

The feature extraction network may be a residual network, which includes a plurality of cascaded network structures. Before feature information of image frames is inputted into each network structure, the computer device may perform feature fusion on the feature information according to the feature fusion policy. In a possible implementation, before feature information of image frames is inputted into some network structures, feature fusion is performed on the feature information according to the feature fusion policy.

In this embodiment of this application, the second feature information is feature information of the first image frame outputted by the feature extraction network, or intermediate feature information of the first image frame generated by the feature extraction network. When the second feature information is the intermediate feature information of the first image frame generated by the feature extraction network, the intermediate feature information is processed by using another network structure after the $k^{th}$ network structure, to obtain the feature information of the first image frame.

Based on the above, in the through provided in this embodiment of this application, by using a learned convolution kernel to perform feature fusion on feature information of image frames, an operation is simple, and a workload is small.

Figure 5:
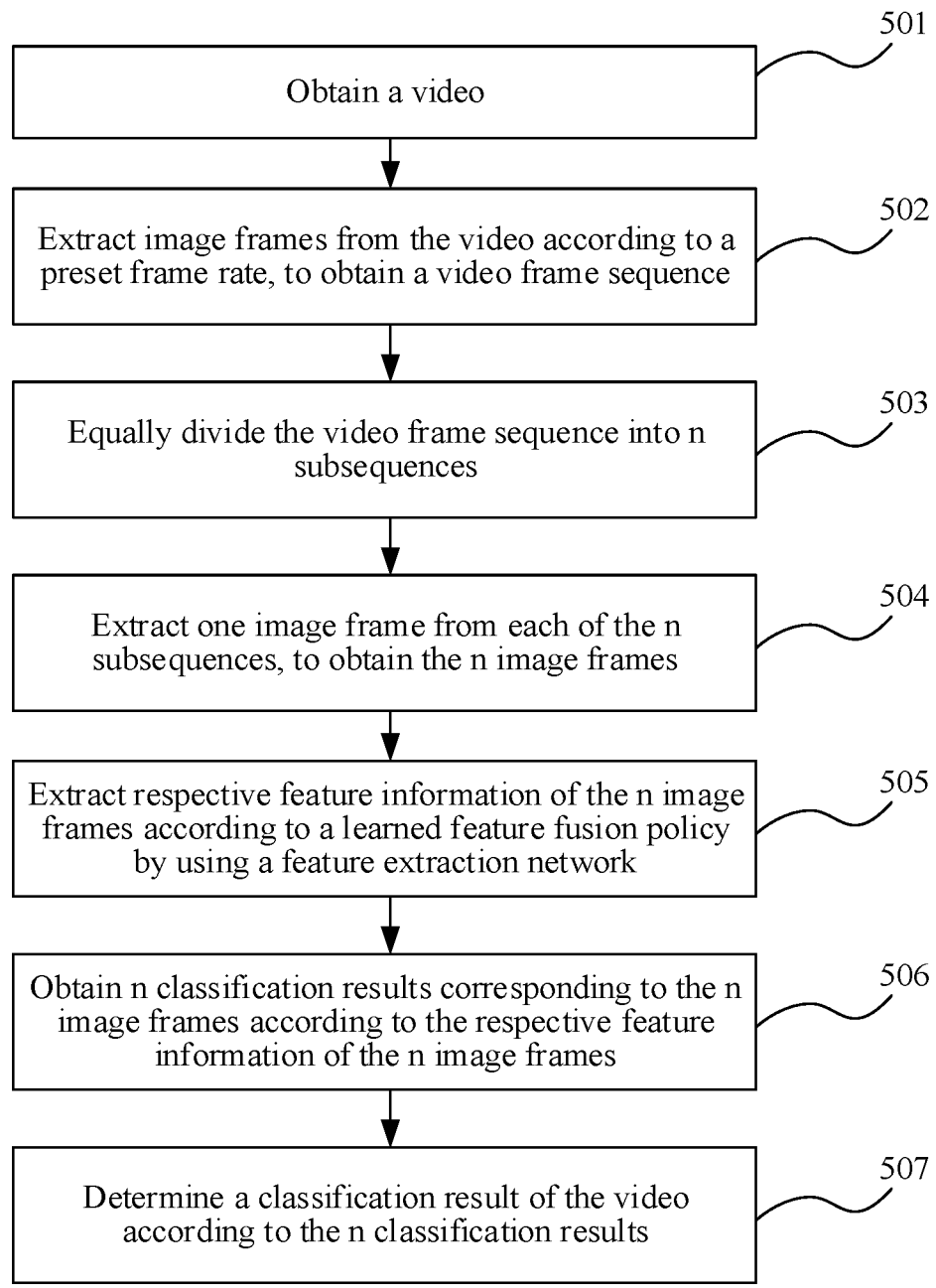
FIG. 5 is a flowchart of a video classification method according to another embodiment of this application.

In an exemplary embodiment, as shown in FIG. 5, the video classification method provided in the embodiments of this application may alternatively include the following steps:

Step 501: Obtain a video.

Step 502: Extract image frames from the video according to a preset frame rate, to obtain a video frame sequence.

The preset frame rate may be 24 frame/second. The preset frame rate may be a default frame rate, or may be a frame rate set by researchers according to an actual requirement.

Step 503: Equally divide the video frame sequence into n subsequences.

A length of each subsequence is 1/n of the video frame sequence. n may be 8, 16, or 24. A value of n is not limited in this embodiment of this application. In an actual application, n is generally a multiple of 2.

Step 504: Extract one image frame from each of the n subsequences, to obtain the n image frames.

Figure 6:
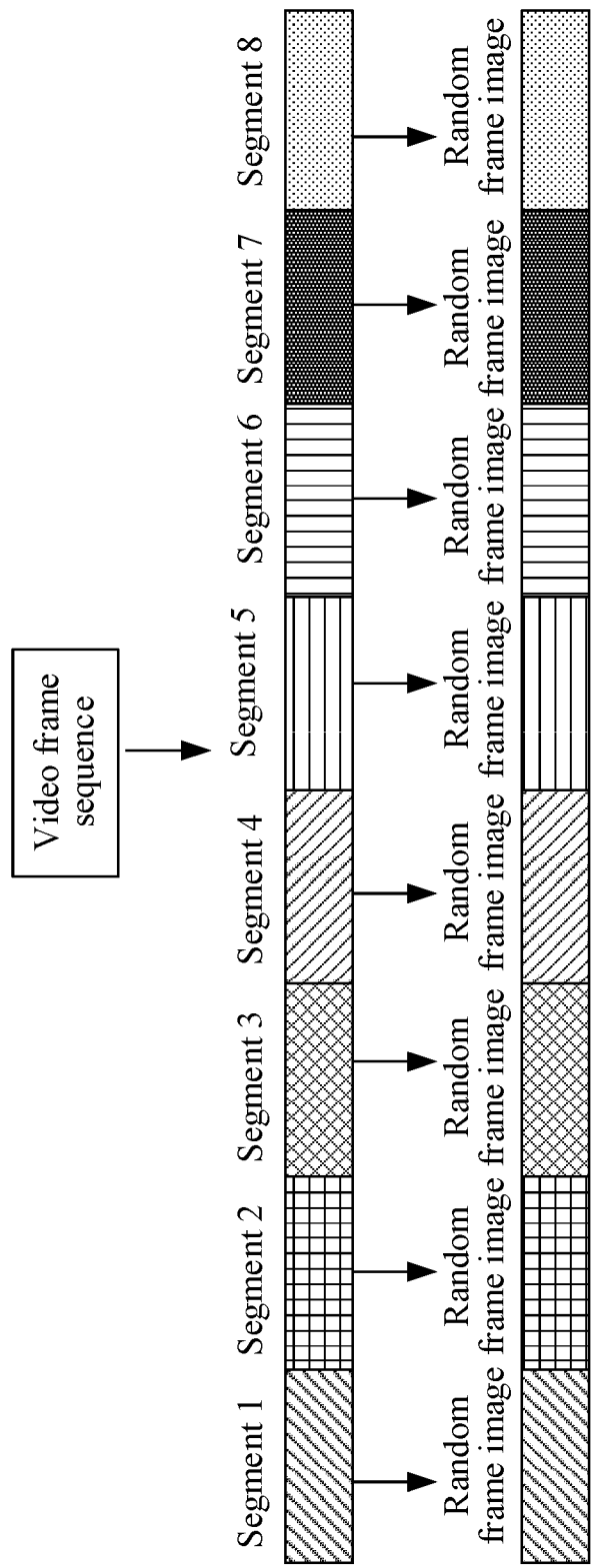
FIG. 6 is a schematic diagram of image frame selection according to an embodiment of this application.

In step 502 to step 504, image frames are selected from the video by using an image frame extraction policy based on sparse sampling. Feature information of each image frame represents feature information of a subsequence, and the video frame sequence of any length is converted into n image frames that cover the entire video as much as possible to retain time information as much as possible. In some embodiments, the computer device may randomly extract one image frame from each subsequence, to obtain n image frames; and the computer device may alternatively select an image frame at a fixed position in each subsequence (for example, the computer device may select a first image frame or a last image frame in each subsequence). A manner of extracting image frames from the subsequences is not limited in this embodiment of this application. For example, as shown in FIG. 6, the computer device extracts image frames from the video according to the preset frame rate, to obtain a video frame sequence. An example in which n is 8 is used for description. The computer device equally divides the video frame sequence into 8 subsequences: segment 1, segment 2, segment 3, . . . , segment 8, and randomly extracts one image frame from each of the 8 subsequences, to obtain 8 image frames.

Step 505: Extract respective feature information of the n image frames according to a learned feature fusion policy by using a feature extraction network.

In this embodiment of this application, the feature fusion policy is used for indicating, when a first image frame in the n image frames is fused with feature information of other image frames in the n image frames, proportions of the feature information of the image frames.

Step 506: Obtain n classification results corresponding to the n image frames according to the respective feature information of the n image frames.

The n image frames are in a one-to-one correspondence with the n classification results. That is, each image frame corresponds to one classification result.

Figure 7:
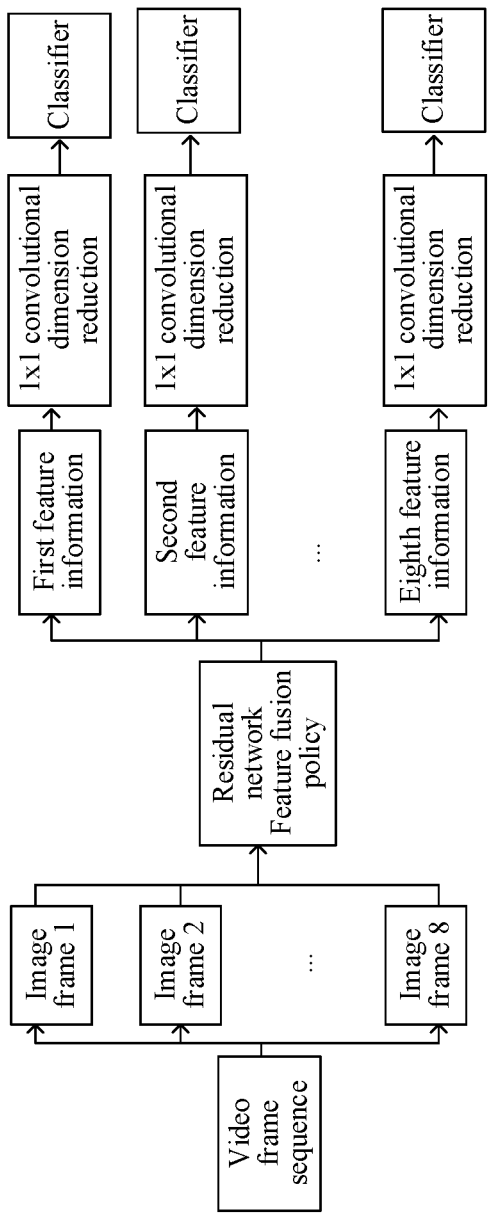
FIG. 7 is a schematic diagram of local image frame enhancement policy according to an embodiment of this application.

For example, as shown in FIG. 7, the computer device may obtain a classification result corresponding to each image frame in the following manner:

1. performing dimension reduction on feature information of a $j^{th}$ image frame in then image frames, to obtain dimension-reduced feature information of the $j^{th}$ image frame; and
2. obtaining a classification result corresponding to the $j^{th}$ image frame according to the dimension-reduced feature information of the $j^{th}$ image frame by using a $j^{th}$ classifier in n classifiers, j being a positive integer less than or equal to n.

Dimension reduction is first performed on feature information of an image frame, and a classifier is trained according to dimension-reduced feature information of the image frame, which facilitates optimization of the classifier and reduces calculation pressure of the computer device.

Step 507: Determine a classification result of the video according to the n classification results.

In some embodiments, a sum of products of the n classification results and weights respectively corresponding to the n classification results is determined as the classification result of the video. Certainly, in another possible implementation, the n classification results may be averaged, and an average value is used as the classification result of the video.

Figure 8:
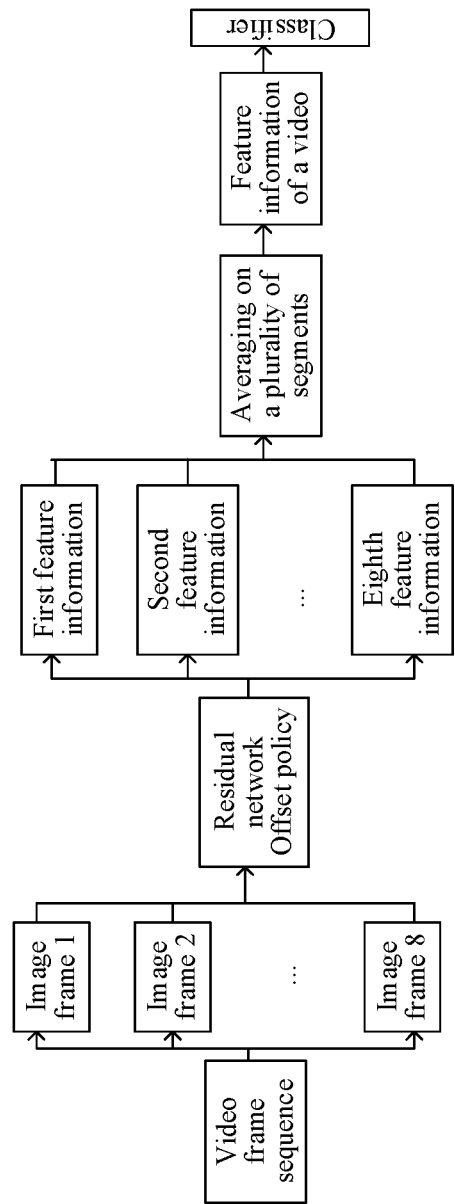
FIG. 8 is a schematic diagram of a video classification method in the related art.

A policy corresponding to step 506 and step 507 may be referred to as a local image frame enhancement policy. By using the local image frame enhancement policy to process the image frames, feature expression capabilities of the image frames, especially edge image frames (image frames at the beginning and the end of the video), are enhanced. Compared with performing an average operation on the respective feature information of the n image frames in the related art shown in FIG. 8, in this embodiment of this application, a video classification index is implemented by requiring local features, so that sufficiently distinguishable features also need to be mined from the local features, thereby enhancing expression capabilities of the local features, especially the feature information of the edge image frames. Therefore, a finally determined classification result of the video is more accurate.

Even if the feature fusion policy is used to perform time feature fusion on the n image frames for a plurality of times, and each image frame can be fused with feature information of a plurality of other image frames, to obtain information within a longer time range, capturing of large-range time information is still lacking and insufficient for the edge image frames. Correspondingly, the edge image frames are insufficient for modeling of the feature information of the video, that is, the expression ability of the edge image frames for the video is insufficient. In this case, by simply using the average policy in the related art shown in FIG. 8 to integrate the respective feature information of the n image frames into the feature information of the video, and subsequently using a classifier to perform final prediction on a classification result of the video according to the feature information of the video, to equally treat the feature information of the edge image frames and the feature information of other image frames, a video expression capability finally obtained through averaging is also burdened by the feature information of the edge image frames, and the feature information of the edge image frames finally affects a final video modeling capability. In this embodiment of this application, for each single image frame, a classifier is used to execute an action recognition task, to force the edge image frames to mine more useful information when information is insufficient, thereby enhancing information expression capabilities of the edge image frames.

Based on the above, in the technical solution provided in this embodiment of this application, by setting a classifier for feature information of each image frame, feature expression capabilities of the image frames are enhanced.

Figure 9:
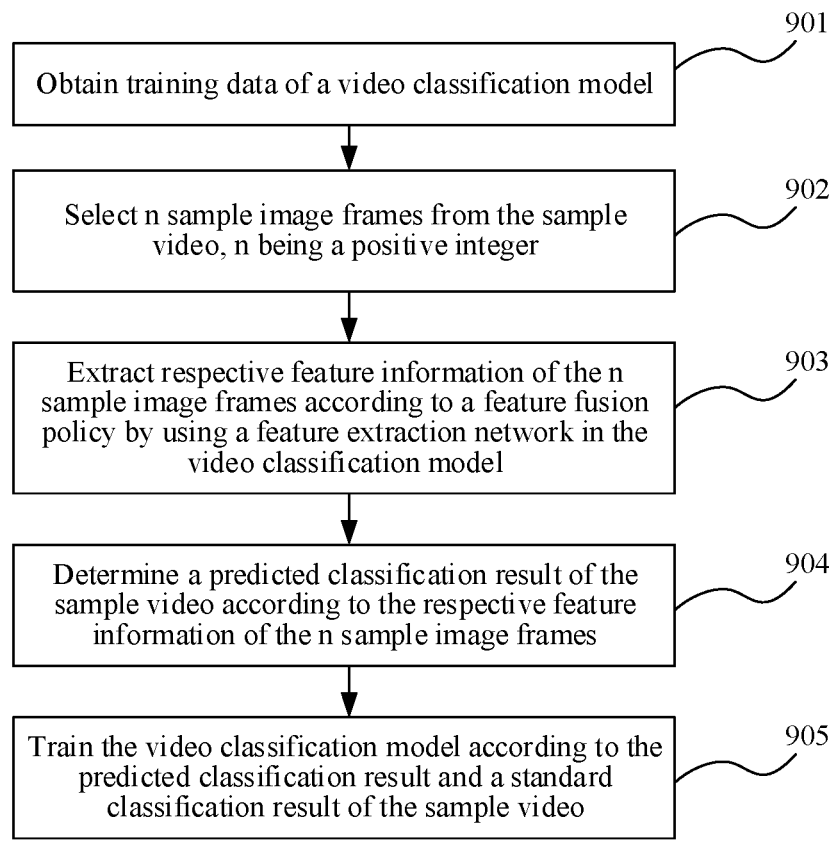
FIG. 9 is a flowchart of a method for training a video classification model according to an embodiment of this application.

FIG. 9 is a flowchart of a method for training a video classification model according to an embodiment of this application. An execution entity of the method may be computer device, such as the server or the terminal described in FIG. 1. The method may include the following steps:

Step 901: Obtain training data of a video classification model.

The video classification model is configured to determine a classification result of a video. In this embodiment of this application, the training data includes at least one sample video. Classification results of the sample videos included in the training data are consistent.

Step 902: Select n sample image frames from the sample video, n being a positive integer.

For descriptions of step 902, reference may be made to the descriptions of step 502 to step 504, and details are not described herein again.

Step 903: Extract respective feature information of the n sample image frames according to a feature fusion policy by using a feature extraction network in the video classification model.

In this embodiment of this application, the feature fusion policy is used for indicating, when a first sample image frame in the n sample image frames is fused with feature information of other sample image frames in the n sample image frames, proportions of the feature information of the sample image frames.

It is assumed that a batch size during training is N, that is, each iterative training includes N video frame sequences, n image frames are selected from each video frame sequence, and a size of each image frame is H×W, H representing a height of the image frame, and W representing a width of the image frame; and it is assumed that feature information includes features of c channels, that is, a quantity of feature channels is c, each video frame sequence corresponds to one video classification model, and a size of an input X of a residual structure is (Nn)×c×H×W, then a feature fusion process is: first reshaping the input X, to change an expression form thereof into (N×H×W)×c×n, where in this case, it can be approximately considered that for each spatial position (H, W) in the N video frame sequences, a feature expression thereof is formed by feature information of n image frames, a quantity of feature channels of each image frame being c; performing a convolution operation on the image frames by using a learned convolution kernel, to obtain feature information after convolution; and then reshaping the feature information after convolution, to change an expression form of the feature information after convolution into (Nn)×c×H×W. Spatial convolution is performed on the processed feature information by using a network structure, to obtain feature information after spatial convolution. The input is added to the feature information after spatial convolution, to obtain final feature information.

Step 904: Determine a predicted classification result of the sample video according to the respective feature information of the n sample image frames.

For descriptions of step 904, reference may be made to the foregoing embodiments, and details are not described herein.

Step 905: Train the video classification model according to the predicted classification result and a standard classification result of the sample video.

The predicted classification result is used for representing a classification of the video predicted by the video classification model, and the standard classification result of the sample video may be a manually labeled classification result. For example, the video classification model may be trained according to a distance between the predicted classification result and the standard classification result. For example, the video classification model is trained according to a cosine distance, a Euclidean distance, a Manhattan distance, or another distance between the predicted classification result and the standard classification result. When the distance between the predicted classification result and the standard classification result is shorter than a preset distance, training of the video classification model is stopped. A shorter distance between the predicted classification result and the standard classification result indicates a more accurate video classification model.

For example, the computer device may calculate a loss function value corresponding to the video classification model according to the predicted classification result and the standard classification result, and trains the video classification model according to the loss function value. In a possible implementation, when the loss function value is less than a preset threshold, the training of the video classification model is stopped. The loss function value is used for representing an inconsistency degree between the predicted classification result and the standard classification result. If the loss function value is relatively small, it indicates that the predicted classification result is very close to the standard classification result, and performance of the video classification model is good; and if the loss function value is relatively large, it indicates that the predicted classification result is very different from the standard classification result, and performance of the video classification model is poor.

In a possible implementation, the computer device may adjust the feature fusion policy according to the loss function value.

In some embodiments, a parameter of a convolution kernel is adjusted according to the loss function value, the convolution kernel being configured to define a feature fusion policy corresponding to a feature of an $i^{th}$ channel in the first sample image frame, i being a positive integer.

The feature fusion policy is adjusted according to the loss function value, to implement training of the video classification model. A plurality of rounds of adjustments may be performed, and when a first stop training condition is met, training of the feature fusion policy is stopped.

The first stop training condition may include any one of the following: when the loss function value meets a preset threshold, stopping the training of the feature fusion policy; or when a quantity of training times reaches a preset quantity of times, for example, 100,000 times, stopping the training of the feature fusion policy; or when a difference between a loss function value obtained through a $(k+1)^{th}$ calculation and a loss function value obtained through a $k^{th}$ calculation is less than a preset difference, for example, $10^{-9}$, stopping the training of the feature fusion policy.

In a possible implementation, the video classification model further includes n classifiers. The computer device may adjust parameters of the n classifiers according to the loss function value, an $h^{th}$ classifier in the n classifiers being configured to: obtain a predicted classification result corresponding to the first sample image frame according to feature information of the first sample image frame, h being a positive integer less than or equal to n.

The parameters of the classifiers are adjusted according to the loss function value, to implement training of the video classification model. A plurality of rounds of adjustments may be performed, and when a second stop training condition is met, training of the parameters of the classifiers is stopped.

The second stop training condition may include any one of the following: when the loss function value meets a preset threshold, stopping the training of the parameters of the classifiers; or when a quantity of training times reaches a preset quantity of times, for example, 100,000 times, stopping the training of the parameters of the classifiers; or when a difference between a loss function value obtained through a $(k+1)^{th}$ calculation and a loss function value obtained through a $k^{th}$ calculation is less than a preset difference, for example, $10^{-9}$, stopping the training of the parameters of the classifiers.

In a possible implementation, the server adjusts the feature fusion policy and the classifiers according to the loss function value. When the first stop training condition is met, the training of the feature fusion policy is stopped; and when the second stop training condition is met, the training of the parameters of the classifiers is stopped.

The first stop training condition and the second stop training condition may be the same or different. This is not limited in this embodiment of this application.

Based on the above, in the technical solution provided in this embodiment of this application, feature information of image frames is extracted according to a learned feature fusion policy, the feature fusion policy indicating, when each image frame is fused with feature information of other image frames, proportions of the feature information of the image frames, and a classification result of a video is determined according to the feature information of the image frames. According to the feature fusion policy, only simple information fusion between adjacent image frames needs to be implemented, and it is unnecessary to perform convolution in both a spatial dimension and a time dimension as 3D convolution. In the feature fusion policy, by replacing complex and repeated 3D convolution operations with simple feature information fusion of other image frames, a workload is small, and a time for finally obtaining a classification result of the video is relatively short, thereby having high efficiency.

Apparatus embodiments of this application are described below, which may be used for performing the method embodiments of this application. For details not disclosed in the apparatus embodiments of this application, reference may be made to the method embodiments of this application.

Figure 10:
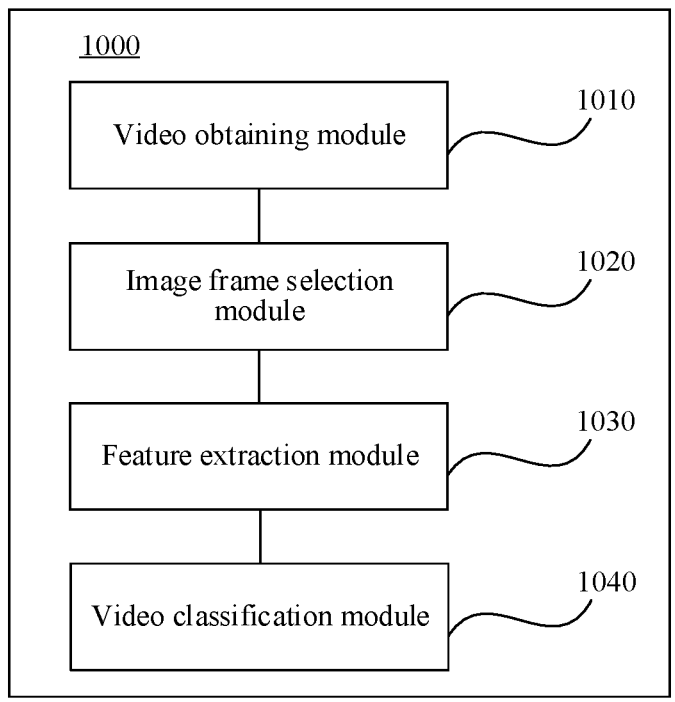
FIG. 10 is a block diagram of a video classification apparatus according to an embodiment of this application.

FIG. 10 is a block diagram of a video classification apparatus according to an embodiment of this application. The apparatus has a function of realizing the example of the foregoing video classification method, and the function may be realized by hardware or by hardware executing corresponding software. The apparatus may be a computer device or may be disposed in a computer device. The apparatus 1000 may include: a video obtaining module 1010, an image frame selection module 1020, a feature extraction module 1030, and a video classification module 1040.

The video obtaining module 1010 is configured to obtain a video.

The image frame selection module 1020 is configured to select n image frames from the video, n being a positive integer.

The feature extraction module 1030 is configured to extract respective feature information of the n image frames according to a learned feature fusion policy by using a feature extraction network, the feature fusion policy being used for indicating, when a first image frame in the n image frames is fused with feature information of other image frames in then image frames, proportions of the feature information of the image frames.

The video classification module 1040 is configured to determine a classification result of the video according to the respective feature information of the n image frames.

Based on the above, in the technical solution provided in this embodiment of this application, feature information of image frames is extracted according to a learned feature fusion policy, the feature fusion policy indicating, when each image frame is fused with feature information of other image frames, proportions of the feature information of the image frames, and a classification result of a video is determined according to the feature information of the image frames. According to the feature fusion policy, only simple information fusion between adjacent image frames needs to be implemented, and it is unnecessary to perform convolution in both a spatial dimension and a time dimension as 3D convolution. In the feature fusion policy, by replacing complex and repeated 3D convolution operations with simple feature information fusion, a workload is small, and a time for finally obtaining a classification result of the video is relatively short, thereby having high efficiency.

In an exemplary embodiment, the feature extraction network includes m cascaded network structures, m being a positive integer; and the feature extraction module 1030 is configured to:
perform, for the first image frame and before first feature information of the first image frame is inputted into a $k^{th}$ network structure of the feature extraction network, feature fusion on the first feature information according to the feature fusion policy, to obtain processed first feature information, the processed first feature information being fused with feature information of the first image frame and the other image frames, k being a positive integer less than or equal to m; and
process the processed first feature information by using the $k^{th}$ network structure, to generate second feature information of the first image frame,
the second feature information being feature information of the first image frame outputted by the feature extraction network, or intermediate feature information of the first image frame generated by the feature extraction network.

In an exemplary embodiment, the first feature information includes features of c channels, c being a positive integer; and
the feature extraction module 1030 is configured to:
perform, for a feature of an $i^{th}$ channel in the first feature information, a convolution operation on a feature of the $i^{th}$ channel in the first image frame and features of the $i^{th}$ channel in the other image frames by using a learned convolution kernel, to obtain a processed feature of the $i^{th}$ channel in the first image frame, i being a positive integer less than or equal to c; and
obtain the processed first feature information according to the processed features of the channels in the first image frame,
the convolution kernel being configured to define a feature fusion policy corresponding to the feature of the $i^{th}$ channel in the first image frame.

Figure 11:
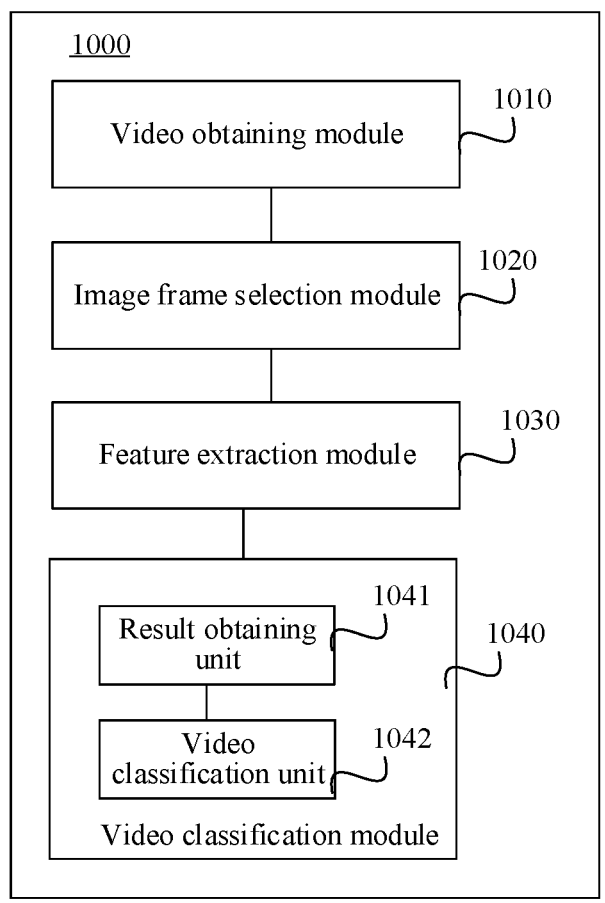
FIG. 11 is a block diagram of a video classification apparatus according to another embodiment of this application.

In an exemplary embodiment, as shown in FIG. 11, the video classification module 1040 includes: a result obtaining unit 1041 and a video classification unit 1042.

The result obtaining unit 1041 is configured to obtain n classification results corresponding to the n image frames according to the respective feature information of the n image frames.

The video classification unit 1042 is configured to determine the classification result of the video according to the n classification results.

In an exemplary embodiment, the result obtaining unit 1041 is configured to:
perform dimension reduction on feature information of a $j^{th}$ image frame in the n image frames, to obtain dimension-reduced feature information of the $j^{th}$ image frame; and
obtain a classification result corresponding to the $j^{th}$ image frame according to the dimension-reduced feature information of the $j^{th}$ image frame by using a $j^{th}$ classifier in n classifiers, j being a positive integer less than or equal to n.

In an exemplary embodiment, the video classification unit 1042 is configured to:

determine a sum of products of the n classification results and weights respectively corresponding to the n classification results as the classification result of the video.

In an exemplary embodiment, the image frame selection module 1020 is configured to:

extract image frames from the video according to a preset frame rate, to obtain a video frame sequence;

equally divide the video frame sequence into n subsequences; and extract one image frame from each of the n subsequences, to obtain the n image frames.

Figure 12:
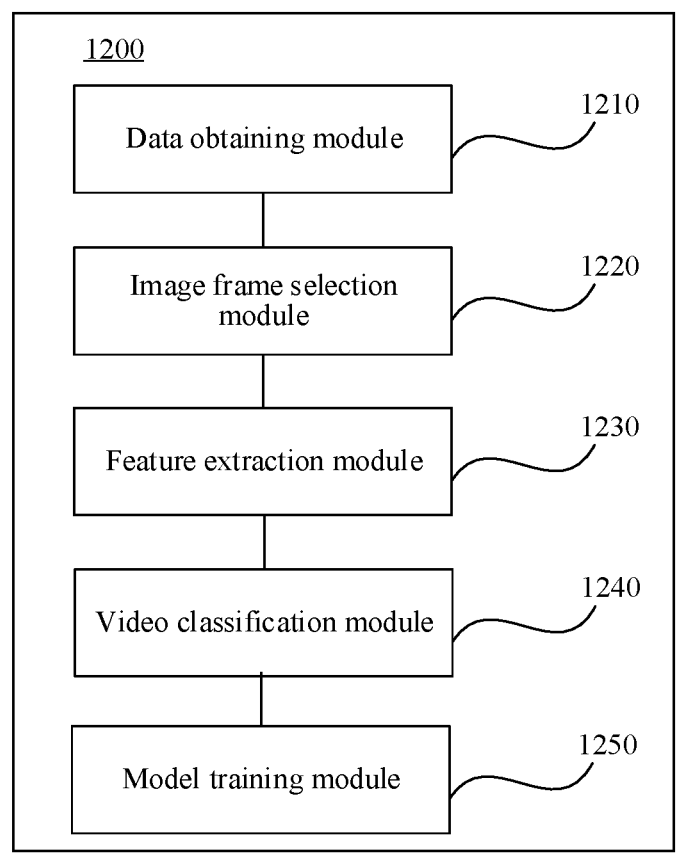
FIG. 12 is a block diagram of an apparatus for training a video classification model according to an embodiment of this application.

FIG. 12 is a block diagram of an apparatus for training a video classification model according to an embodiment of this application. The apparatus has a function of realizing the example of the foregoing method for training a video classification model, and the function may be realized by hardware or by hardware executing corresponding software. The apparatus may be a computer device or may be disposed in a computer device. The apparatus 1200 may include: a data obtaining module 1210, an image frame selection module 1220, a feature extraction module 1230, a video classification module 1240, and a model training module 1250.

The data obtaining module 1210 is configured to obtain training data of a video classification model, the training data including at least one sample video.

The image frame selection module 1220 is configured to select n sample image frames from the sample video, n being a positive integer.

The feature extraction module 1230 is configured to extract respective feature information of the n sample image frames according to a feature fusion policy by using a feature extraction network in the video classification model, the feature fusion policy being used for indicating, when a first sample image frame in the n sample image frames is fused with feature information of other sample image frames in the n sample image frames, proportions of the feature information of the sample image frames.

The video classification module 1240 is configured to determine a predicted classification result of the sample video according to the respective feature information of the n sample image frames.

The model training module 1250 is configured to train the video classification model according to the predicted classification result and a standard classification result of the sample video.

Based on the above, in the technical solution provided in this embodiment of this application, feature information of image frames is extracted according to a learned feature fusion policy, the feature fusion policy indicating, when each image frame is fused with feature information of other image frames, proportions of the feature information of the image frames, and a classification result of a video is determined according to the feature information of the image frames. According to the feature fusion policy, only simple information fusion between adjacent image frames needs to be implemented, and it is unnecessary to perform convolution in both a spatial dimension and a time dimension as 3D convolution. In the feature fusion policy, by replacing complex and repeated 3D convolution operations with simple feature information fusion of other image frames, a workload is small, and a time for finally obtaining a classification result of the video is relatively short, thereby having high efficiency.

Figure 13:
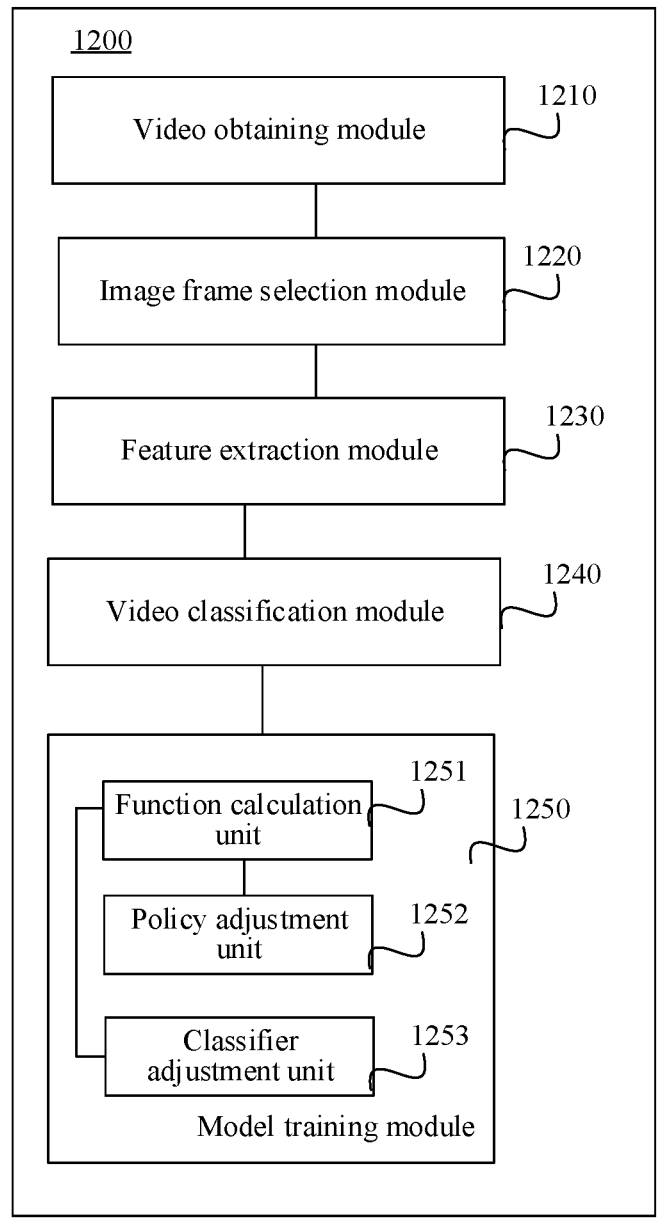
FIG. 13 is a block diagram of an apparatus for training a video classification model according to an embodiment of this application.

In an exemplary embodiment, as shown in FIG. 13, the model training module 1250 includes: a function calculation unit 1251 and a policy adjustment unit 1252.

The function calculation unit 1251 is configured to calculate a loss function value corresponding to the video classification model according to the predicted classification result and the standard classification result.

The policy adjustment unit 1252 is configured to adjust the feature fusion policy according to the loss function value.

In an exemplary embodiment, the policy adjustment unit 1252 is configured to:

adjust a parameter of a convolution kernel according to the loss function value, the convolution kernel being configured to define a feature fusion policy corresponding to a feature of an $i^{th}$ channel in the first sample image frame, i being a positive integer.

In an exemplary embodiment, the video classification model further includes n classifiers; and the model training module 1250 further includes a classifier adjustment unit 1253.

The classifier adjustment unit 1253 is configured to adjust parameters of the n classifiers according to the loss function value, an $h^{th}$ classifier in the n classifiers being configured to: obtain a predicted classification result corresponding to the first sample image frame according to feature information of the first sample image frame, h being a positive integer less than or equal to n.

When the apparatus provided in the foregoing embodiments implements functions of the apparatus, it is illustrated with an example of division of each functional module. In the practical application, the function distribution may be finished by different functional modules according to the requirements, that is, the internal structure of the device is divided into different functional modules, to implement all or some of the functions described above. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In addition, the apparatus and method embodiments provided in the foregoing embodiments belong to the same conception. For the specific implementation process, reference may be made to the method embodiments, and details are not described herein again.

Figure 14:
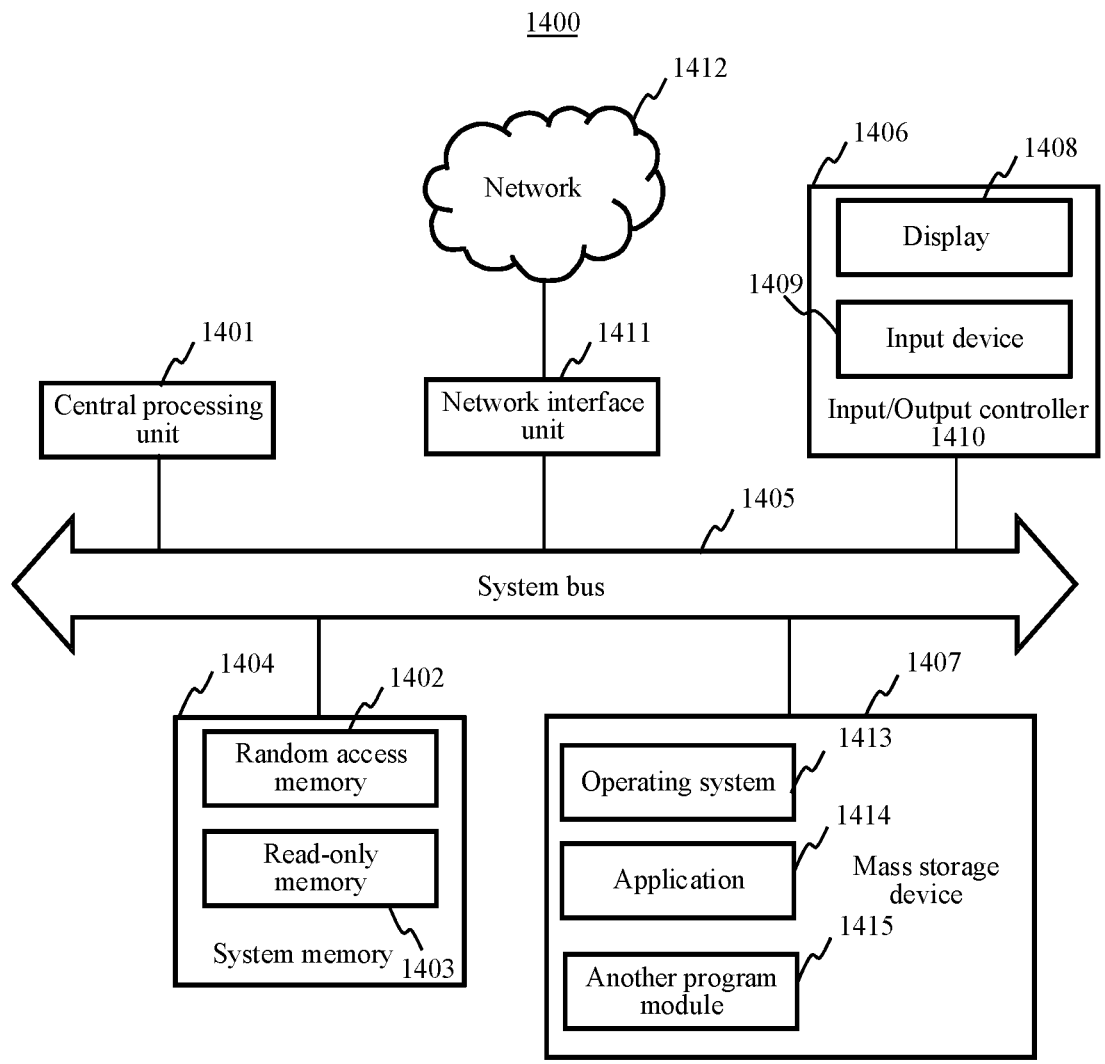
FIG. 14 is a schematic structural diagram of a computer device according to an embodiment of this application.

FIG. 14 is a schematic structural diagram of a computer device 1400 according to an embodiment of this application. The computer device 1400 may be configured to implement the method provided in the foregoing embodiments. The computer device 1400 may be the terminal 10 or the server 20 described in the embodiment in FIG. 1. Specifically:

The computer device 1400 includes a central processing unit (CPU) 1401, a system memory 1404 including a random access memory (RAM) 1402 and a read only memory (ROM) 1403, and a system bus 1405 connecting the system memory 1404 and the central processing unit 1401. The computer device 1400 further includes a basic input/output system (I/O system) 1406 configured to transmit information between components in the computer, and a mass storage device 1407 configured to store an operating system 1413, an application 1414, and another program module 1415.

The basic I/O system 1406 includes a display 1408 configured to display information and an input device 1409 such as a mouse or a keyboard that is configured for information inputting by a user. The display 1408 and the input device 1409 are both connected to the CPU 1401 by an input/output controller 1410 connected to the system bus 1405. The basic I/O system 1406 may further include the input/output controller 1410, to receive and process inputs from a plurality of other devices, such as a keyboard, a mouse, or an electronic stylus. Similarly, the input/output controller 1410 further provides an output to a display screen, a printer, or another type of output device.

The mass storage device 1407 is connected to the CPU 1401 through a mass storage controller (not shown) connected to the system bus 1405. The mass storage device 1407 and an associated computer-readable medium provide non-volatile storage for the computer device 1400. That is, the mass storage device 1407 may include a computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the foregoing several types. The system memory 1404 and the mass storage device 1407 may be collectively referred to as a memory.

According to the various embodiments of this application, the computer device 1400 may further be connected, through a network such as the Internet, to a remote computer on the network for running. That is, the computer device 1400 may be connected to a network 1412 by using a network interface unit 1411 connected to the system bus 1405, or may be connected to another type of network or a remote computer system (not shown) by using a network interface unit 1411.

The memory further includes one or more programs. The one or more programs are stored in the memory and configured to be executed by one or more processors. The one or more programs contain instructions used for implementing the foregoing video classification method or implement the foregoing method for training a video classification model.

In an exemplary embodiment, a computer device is further provided, including a processor and a memory, the memory storing at least one instruction, at least one program, a code set, or an instruction set. The at least one instruction, the at least one program, the code set, or the instruction set are configured to be executed by one or more processors to implement the foregoing video classification method or implement the foregoing method for training a video classification model.

In an exemplary embodiment, a computer-readable storage medium is further provided, storing at least one instruction, at least one program, a code set, or an instruction set, the at least one instruction, the at least one program, the code set, or the instruction set, when executed by a processor of a computer device, implementing the foregoing video classification method, or implementing the foregoing method for training a video classification model.

In some embodiments, the computer-readable storage medium may be a ROM, a RAM, a CD-ROM, a magnetic tape, a floppy disk, an optical data storage device, or the like.

In an exemplary embodiment, a computer program product is further provided, the computer program product, when executed, being configured to implement the foregoing video classification method or implement the foregoing method for training a video classification model.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A video classification method performed by a computer device, the method comprising:
    obtaining a video;
    dividing the video into n segments of equal length, n being a positive integer;
    selecting n image frames from the video, each image frame from a corresponding one of the n segments;
    extracting respective feature information of each of the n image frames by using a feature extraction network;
    fusing the feature information of each of the n image frames according to a learned feature fusion policy, the learned feature fusion policy being used for indicating, when a first image frame in the n image frames is fused with feature information of other image frames in the n image frames, proportions of the feature information of the other image frames; and
    determining a classification result of the video according to the respective feature information of the n image frames, wherein feature information of an edge image frame in the n image frames is weighted differently from feature information of a non-edge image frame in the n image frames.

2. The method according to claim 1, wherein the feature extraction network comprises m cascaded network structures, m being a positive integer; and
    the fusing the feature information of each of then image frames according to a learned feature fusion policy comprises:
    before first feature information of the first image frame is inputted into a $k^{th}$ network structure of the feature extraction network, performing feature fusion on the first feature information of the first image frame according to the feature fusion policy, to obtain processed first feature information, the processed first feature information being fused with feature information of the first image frame and the proportions of the feature information of the other image frames, k being a positive integer less than or equal to m; and processing the processed first feature information by using the $k^{th}$ network structure, to generate second feature information of the first image frame, the second feature information being feature information of the first image frame outputted by the feature extraction network, or intermediate feature information of the first image frame generated by the feature extraction network.

3. The method according to claim 2, wherein the first feature information comprises features of c channels, c being a positive integer; and the performing feature fusion on the first feature information of the first image frame according to the feature fusion policy, to obtain processed first feature information comprises:

performing, for a feature of an $i^{th}$ channel in the first feature information of the first image frame, a convolution operation on the feature of the $i^{th}$ channel in the first image frame and features of the $i^{th}$ channel in the other image frames by using a learned convolution kernel, to obtain a processed feature of the $i^{th}$ channel in the first image frame, i being a positive integer less than or equal to c, the convolution kernel being configured to define a feature fusion policy corresponding to the feature of the $i^{th}$ channel in the first image frame; and obtaining the processed first feature information according to the processed features of the channels in the first image frame.

4. The method according to claim 1, wherein the determining a classification result of the video according to the respective feature information of the n image frames comprises:

obtaining n classification results corresponding to the n image frames according to the respective feature information of the n image frames; and determining the classification result of the video according to then classification results.

5. The method according to claim 4, wherein the obtaining n classification results corresponding to the n image frames according to the respective feature information of the n image frames comprises:

performing dimension reduction on feature information of a $j^{th}$ image frame in the n image frames, to obtain dimension-reduced feature information of the $j^{th}$ image frame; and obtaining a classification result corresponding to the $j^{th}$ image frame according to the dimension-reduced feature information of the $j^{th}$ image frame by using a $j^{th}$ classifier in n classifiers, j being a positive integer less than or equal to n.

6. The method according to claim 4, wherein the determining the classification result of the video according to the n classification results comprises:

determining a sum of products of then classification results and weights respectively corresponding to the n classification results as the classification result of the video.

7. The method according to claim 1, wherein the selecting n image frames from the video comprises:

extracting image frames from the video according to a preset frame rate, to obtain a video frame sequence;

equally dividing the video frame sequence into n subsequences; and extracting one image frame from each of the n subsequences, to obtain the n image frames.

8. A computer device, comprising a processor and a memory, the memory storing at least one program, the at least one program being loaded and executed by the processor to perform a plurality of operations including:

obtaining a video;

dividing the video into n segments of equal length, n being a positive integer;

selecting n image frames from the video, each image frame from a corresponding one of the n segments;

extracting respective feature information of each of the n image frames by using a feature extraction network;

fusing the feature information of each of the n image frames according to a learned feature fusion policy, the learned feature fusion policy being used for indicating, when a first image frame in the n image frames is fused with feature information of other image frames in the n image frames, proportions of the feature information of the other image frames; and determining a classification result of the video according to the respective feature information of the n image frames, wherein feature information of an edge image frame in the n image frames is weighted differently from feature information of a non-edge image frame in the n image frames.

9. The computer device according to claim 8, wherein the feature extraction network comprises m cascaded network structures, m being a positive integer; and the fusing the feature information of each of then image frames according to a learned feature fusion policy comprises:

before first feature information of the first image frame is inputted into a $k^{th}$ network structure of the feature extraction network, performing feature fusion on the first feature information of the first image frame according to the feature fusion policy, to obtain processed first feature information, the processed first feature information being fused with feature information of the first image frame and the other image frames, k being a positive integer less than or equal to m; and processing the processed first feature information by using the $k^{th}$ network structure, to generate second feature information of the first image frame, the second feature information being feature information of the first image frame outputted by the feature extraction network, or intermediate feature information of the first image frame generated by the feature extraction network.

10. The computer device according to claim 9, wherein the first feature information comprises features of c channels, c being a positive integer; and the performing feature fusion on the first feature information of the first image frame according to the feature fusion policy, to obtain processed first feature information comprises:

performing, for a feature of an $i^{th}$ channel in the first feature information of the first image frame, a convolution operation on the feature of the $i^{th}$ channel in the first image frame and features of the $i^{th}$ channel in the other image frames by using a learned convolution kernel, to obtain a processed feature of the $i^{th}$ channel in the first image frame, i being a positive integer less than or equal to c, the convolution kernel being configured to define a feature fusion policy corresponding to the feature of the $i^{th}$ channel in the first image frame; and obtaining the processed first feature information according to the processed features of the channels in the first image frame.

11. The computer device according to claim 8, wherein the determining a classification result of the video according to the respective feature information of the n image frames comprises:
   obtaining n classification results corresponding to the n image frames according to the respective feature information of the n image frames; and
   determining the classification result of the video according to then classification results.

12. The computer device according to claim 11, wherein the obtaining n classification results corresponding to the n image frames according to the respective feature information of the n image frames comprises:
   performing dimension reduction on feature information of a $j^{th}$ image frame in the n image frames, to obtain dimension-reduced feature information of the $j^{th}$ image frame; and
   obtaining a classification result corresponding to the $j^{th}$ image frame according to the dimension-reduced feature information of the $j^{th}$ image frame by using a $j^{th}$ classifier in n classifiers, j being a positive integer less than or equal to n.

13. The computer device according to claim 11, wherein the determining the classification result of the video according to the n classification results comprises:
   determining a sum of products of then classification results and weights respectively corresponding to the n classification results as the classification result of the video.

14. The computer device according to claim 8, wherein the selecting n image frames from the video comprises:
   extracting image frames from the video according to a preset frame rate, to obtain a video frame sequence;
   equally dividing the video frame sequence into n subsequences; and
   extracting one image frame from each of the n subsequences, to obtain the n image frames.

15. A non-transitory computer-readable storage medium, storing at least one program, the at least one program, being loaded and executed by a processor of a computer device to perform a plurality of operations including:
   obtaining a video;
   dividing the video into n segments of equal length, n being a positive integer;
   selecting n image frames from the video, each image frame from a corresponding one of the n segments;
   extracting respective feature information of each of the n image frames by using a feature extraction network;
   fusing the feature information of each of the n image frames according to a learned feature fusion policy, the learned feature fusion policy being used for indicating, when a first image frame in the n image frames is fused with feature information of other image frames in the n image frames, proportions of the feature information of the other image frames; and
   determining a classification result of the video according to the respective feature information of the n image frames, wherein feature information of an edge image frame in the n image frames is weighted differently from feature information of a non-edge image frame in the n image frames.

16. The non-transitory computer-readable storage medium according to claim 15, wherein the feature extraction network comprises m cascaded network structures, m being a positive integer; and
   the fusing the feature information of each of then image frames according to a learned feature fusion policy comprises:
   before first feature information of the first image frame is inputted into a $k^{th}$ network structure of the feature extraction network, performing feature fusion on the first feature information of the first image frame according to the feature fusion policy, to obtain processed first feature information, the processed first feature information being fused with feature information of the first image frame and the other image frames, k being a positive integer less than or equal to m; and
   processing the processed first feature information by using the $k^{th}$ network structure, to generate second feature information of the first image frame,
   the second feature information being feature information of the first image frame outputted by the feature extraction network, or intermediate feature information of the first image frame generated by the feature extraction network.

17. The non-transitory computer-readable storage medium according to claim 16, wherein the first feature information comprises features of c channels, c being a positive integer; and
   the performing feature fusion on the first feature information of the first image frame according to the feature fusion policy, to obtain processed first feature information comprises:
   performing, for a feature of an $i^{th}$ channel in the first feature information of the first image frame, a convolution operation on the feature of the $i^{th}$ channel in the first image frame and features of the $i^{th}$ channel in the other image frames by using a learned convolution kernel, to obtain a processed feature of the $i^{th}$ channel in the first image frame, i being a positive integer less than or equal to c, the convolution kernel being configured to define a feature fusion policy corresponding to the feature of the $i^{th}$ channel in the first image frame; and
   obtaining the processed first feature information according to the processed features of the channels in the first image frame.

18. The non-transitory computer-readable storage medium according to claim 15, wherein the determining a classification result of the video according to the respective feature information of the n image frames comprises:
   obtaining n classification results corresponding to the n image frames according to the respective feature information of the n image frames; and
   determining the classification result of the video according to then classification results.

19. The non-transitory computer-readable storage medium according to claim 18, wherein the obtaining n classification results corresponding to then image frames according to the respective feature information of the n image frames comprises:
   performing dimension reduction on feature information of a $j^{th}$ image frame in the n image frames, to obtain dimension-reduced feature information of the $j^{th}$ image frame; and
   obtaining a classification result corresponding to the $j^{th}$ image frame according to the dimension-reduced feature information of the $j^{th}$ image frame by using a $j^{th}$ classifier in n classifiers, j being a positive integer less than or equal to n.

20. The non-transitory computer-readable storage medium according to claim 18, wherein the determining the classification result of the video according to the n classification results comprises:
   determining a sum of products of then classification results and weights respectively corresponding to the n classification results as the classification result of the video.

\* \* \* \* \*